Figure 1:
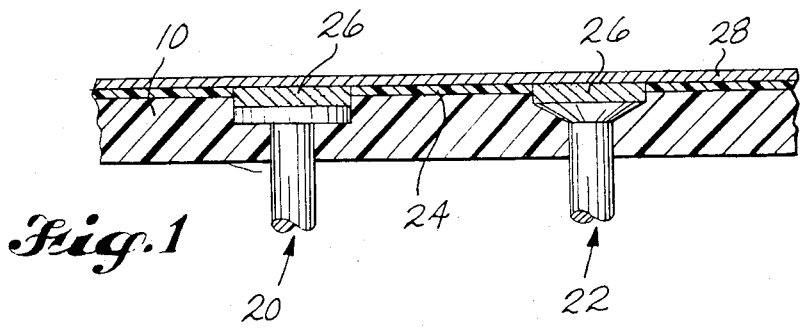

United States Patent [19]

Bannink, Jr. et al.

[11] Patent Number: 4,502,092
[45] Date of Patent: Feb. 26, 1985

[54] INTEGRAL LIGHTNING PROTECTION SYSTEM FOR COMPOSITE AIRCRAFT SKINS

[75] Inventors: Engbert T. Bannink, Jr., Auburn; Glenn O. Olson, Seattle, both of Wash.

[73] Assignee: The Boeing Company, Seattle, Wash.

[21] Appl. No.: 469,346

[22] Filed: Feb. 24, 1983

Related U.S. Application Data

[63] Continuation-in-part of Ser. No. 454,206, Sep. 30, 1982.

[51] Int. Cl.³ .............................................. H05F 1/02
[52] U.S. Cl. ..................................... 361/218; 244/1 A
[58] Field of Search ............... 361/215, 216, 217, 218; 244/1 A; 174/138 R, 138 D, 165

[56] References Cited

U.S. PATENT DOCUMENTS

| 2,982,494 | 5/1961 | Amason | 361/218 X |
| 3,568,311 | 3/1971 | Lawton | 174/138 D |
| 3,755,713 | 8/1973 | Paszkowski | 361/218 |
| 3,879,638 | 4/1975 | Day | 361/218 |
| 3,989,984 | 11/1976 | Amason et al. | 361/218 X |
| 4,382,049 | 5/1983 | Hofmeister et al. | 361/218 X |

Primary Examiner—Harry E. Moose, Jr.
Attorney, Agent, or Firm—Conrad O. Gardner; Bernard A. Donahue

[57] ABSTRACT

Method and structures for enhancing the conductivity of graphite composite materials for lightning protection and prevention of attachment of lightning to fasteners. The integral lightning protection for composite aircraft skins, including skins with fasteners penetrating into fuel tanks, utilizes metal coated or plated graphite fibers which are woven into the outer layer of tape or fabric of the structural component requiring protection.

6 Claims, 6 Drawing Figures

INTEGRAL LIGHTNING PROTECTION SYSTEM FOR COMPOSITE AIRCRAFT SKINS

This is a continuation-in-part of U.S. patent application Ser. No. 454,206, filed Sept. 30, 1982, and also assigned to The Boeing Company.

The present invention relates to aircraft lightning protection systems and, more particularly, to lightning protection structures for composite structural components having fasteners.

It is known that the present planned graphite epoxy composite structural components to be used on aircraft will be subjected to natural lightning strike discharges. The most severe strikes will be limited to structures located at or near the aircraft protuberances (wing tips, stabilizer tips, vertical tips, rudder, elevators, ailerons, some engine cowlings, etc.). These locations are designated Zone 1 and will be subjected to the initial attachment of the lightning channel. The initial attachment lightning strike is characterized by a fast rise, high peak current ($2 \times 10^5$ amp) and a large energy transfer ($2 \times 10^6$ amp$^2$ sec). It can create severe structural damage to unprotected graphite epoxy structure (much more so compared to aluminum structure). Other parts of the structure will be subjected to lesser discharges, called swept stroke lightning. These areas are designated Zone 2 and are located aft of the initial attachment points. Particularly sensitive areas are integral fuel tanks and pressurized sections. Punctures cannot be tolerated in either area but fasteners penetrating the skin and protruding into a fuel tank area have been shown to constitute a fuel ignition source even without a skin puncture. Unprotected fasteners are a preferred attachment point for the lightning and spark because the energy cannot be distributed fast enough into the surrounding graphite epoxy material (due to its low thermal and electrical conductivity). The test criteria for Zone 2 also contains a fast rise current but with a $1 \times 10^5$ amp peak and an energy transfer of $0.25 \times 10^6$ amp$^2$ sec.

Representative of the prior art literature is U.S. Pat. No. 3,755,713, assigned to The Boeing Company. Knitted wire mesh is utilized in U.S. Pat. No. 3,755,713 in contrast to preferred embodiments of the present invention which utilize metal (e.g. nickel) coated or plated graphite fibers. A decorative layer is shown in the reference patent, thereby providing insufficient coverage for fastener heads. Further, in U.S. Pat. No. 3,755,713 there is no insulation between the fasteners and the structure since the reference structure is fiberglass and, therefore, electrically nonconductive.

Heretofore, lightning protection material most commonly utilized for non-metallic structures is aluminum. The aluminum is normally applied as a flame spray, a woven screen, a foil or a plating. Such prior method works satisfactorily when the structure is a dielectric such as fiberglass or Kevlar epoxy. However, aluminum is galvanically incompatible with graphite epoxy forming the composite structures in accordance with the present preferred embodiments. If not isolated from the graphite epoxy, the aluminum will corrode; if isolated, the aluminum loses its effectiveness as a protection system (no electrical path).

As a consequence of the preceding, it is an object of the present invention to provide a more compatible protection system for graphite epoxy structures to prevent future maintenance problems with the protection system.

It is a further object of the present invention to provide woven outer layer structures for composite structural components which include interwoven metal (e.g. nickel) coated or plated graphite fibers.

It is yet a further object of the present invention to provide coating or plating of fiber tows as a function of protection desired, e.g., Zone 1 or Zone 2, in the outer layer of tape or fabric for the structural component requiring lightning protection.

Figure 2:
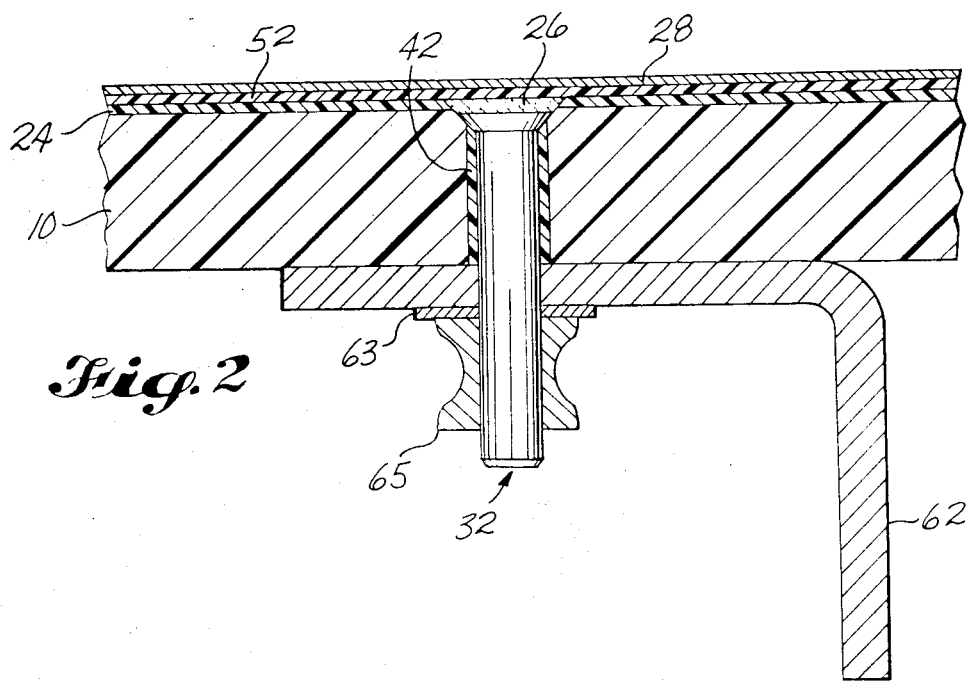
Figure 3:
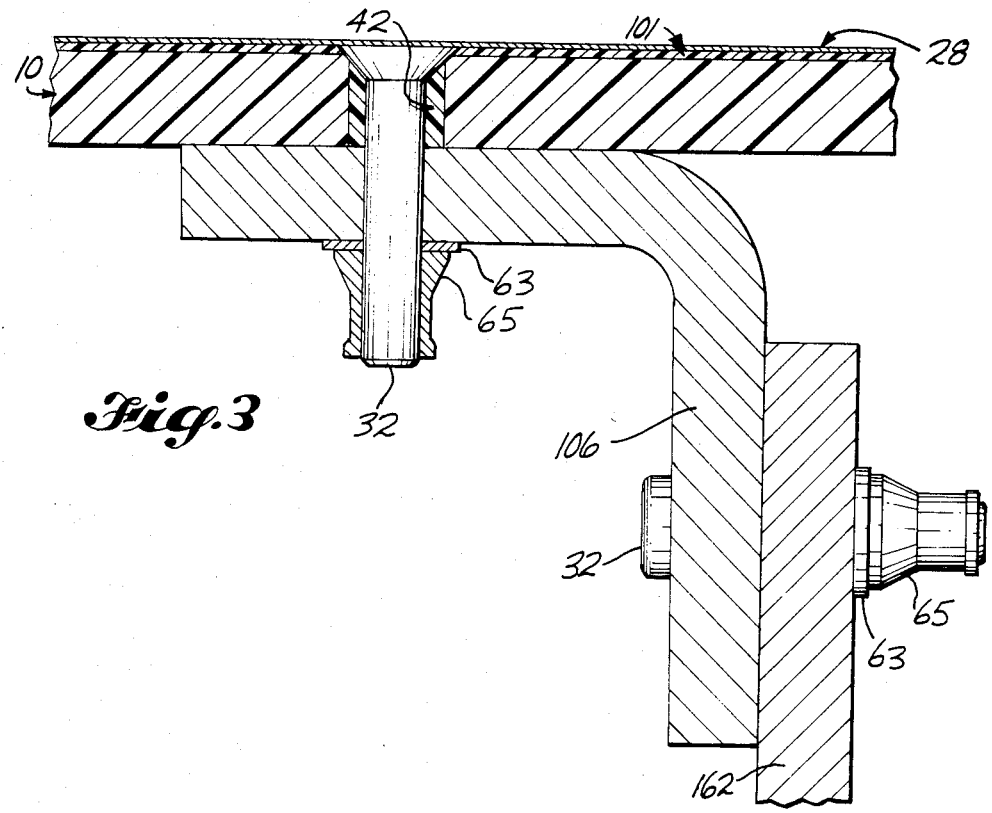
Figure 4:
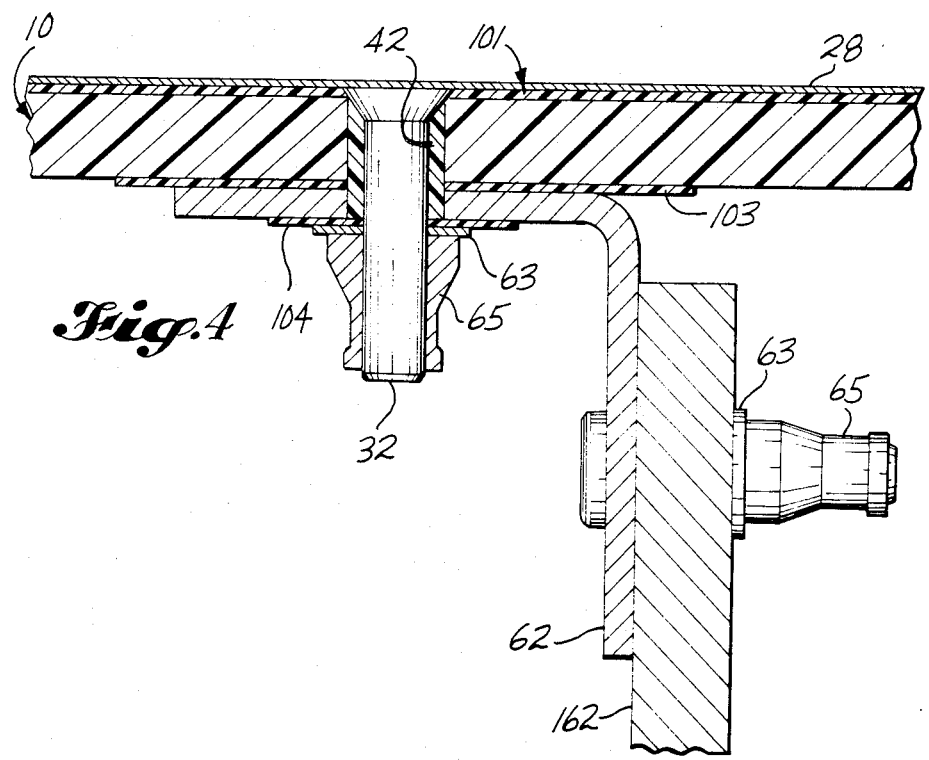
Figure 5:
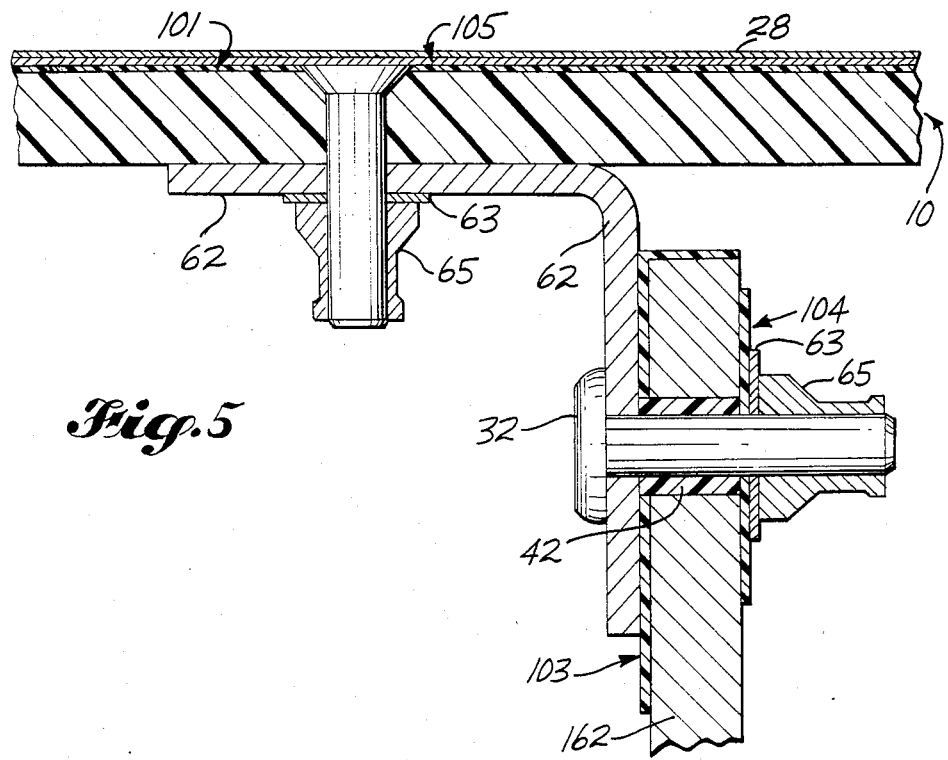
Figure 6:
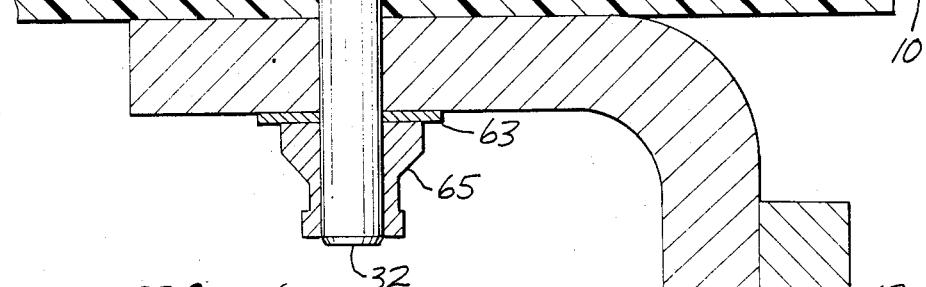

A full understanding of the present invention, and of its further objects and advantages and the several unique aspects thereof, will be had from the following description when taken in conjunction with the accompanying drawing in which:

FIG. 1 is a cross-sectional view of a composite structure including fasteners showing the present metal (e.g. nickel) coated or plated graphite fiber lightning protection;

FIG. 2 is a further embodiment of the present invention showing composite structure and fastener with lightning protection features including metal (e.g. nickel) coated or plated graphite fibers, fiberglass insert to prevent lightning currents from entering the graphite epoxy laminate through a metal (e.g. titanium) fastener and/or use of dielectric strip material over a row of fasteners or single fastener to prevent lightning currents from entering a metal (e.g. titanium) fastener;

FIG. 3 is a cross-sectional view of a further embodiment of a composite structure including metal fasteners having integral lightning protection wherein the potential path between the skin and substructure has been interrupted by utilization of a non-conductive angle member;

FIG. 4 is a cross-sectional view of another embodiment of composite structure including metal fasteners having integral lightning protection for metal fasteners where utilized in needed regions, e.g., as where the metal fasteners penetrate aircraft wing skins and into fuel tanks wherein a conductive angle member is electrically isolated by non-conductive layers between the angle and the skin and between the angle and the fastener retainer;

FIG. 5 is a cross-sectional view of a further lightning protection embodiment of fastener heads in a composite wing skin illustrative of electrical isolation of a conductive angle member from a conductive substructure such as a rib/spar web; and, FIG. 6 is a view in cross section of a composite-fastener assembly utilizing FIG. 3 and 5 features and includes localized dielectric protection of fastener heads in the composite, e.g. skin, and isolation of the skin and substructure, e.g. spar/rib web, with a nonconductive angle member.

Turning now to FIG. 1, a composite aircraft skin structure comprising a graphite epoxy laminate 10 is seen to include a protruding-head fastener 20 and a countersunk fastener 22. The present lightning protection system utilizes a metal (e.g. nickel) coated or plated graphite epoxy tape or fabric ply 24 comprising individual metal (e.g. nickel) coated or plated graphite fibers which are integral or woven into the outer layer of tape or fabric for the structural component requiring protection. Depending on the protection desired (for Zone 1 or Zone 2), either 100% of the fiber tows in both the warp and fill direction of fabric 24 can be coated or plated or a lesser percentage (such as every other tow or every third tow). Similarly, tape can be metal coated or plated with various amounts of metal.

To protect against a direct attachment to a fastener 20 or 22 by a lightning stroke, the fastener holes are counterbored (or both counterbored and countersunk, see FIG. 1) and the counterbore filled with a potting compound or resin 26. The exterior surface of the integral lightning protection system shown in FIG. 1 is coated with primer and paint 28.

Preliminary test results from a simulated Zone 2 lightning strike were encouraging in that the current spread out over a 5-inch diameter area and the damage did not appear to go beyond the first ply of the integral lightning protection assembly of FIG. 1. In contrast, severe local damage (material blown away and delaminated) was experienced on the unprotected part of the graphite epoxy laminate panel structure.

Turning now to FIG. 2, it will be noted that a dielectric (e.g., glass fiber) insulation layer in the form of insert 42 is utilized between metal (e.g. titanium) fastener 32 and graphite epoxy laminate 10 forming the skin structure of the aircraft. Dielectric insert 42 further decreases, in the present lightning protection system, the likelihood of sparking in regions of fuel tanks because of lightning. Lightning currents are thus prevented from entering laminate 10 through metal (e.g. titanium) fastener 32. In addition to providing electrical insulation, dielectric (e.g. fiberglass epoxy) sleeve 42 should provide a structural "softening" effect at the fastener hole (i.e. allow some local yielding) and also minimize the effect of hole imperfections. A further plastic-like strip member 52, sandwiched between metal (e.g. nickel) coated or plated graphite epoxy outer ply 24 and primer and paint exterior surface coating 28, extends over a row (or, as shown here, a single fastener 32).

Metal fastener 32 is shown in FIG. 2 securing graphite epoxy or metal (e.g. titanium) angle member 62 with graphite epoxy composite structural member 10, the fastening assembly further including metal (e.g. corrosion-resistant stainless steel) washer member 63 and metal (e.g. corrosion-resistant stainless steel) shear collar member 65. Dielectric plastic strip member 52 may comprise a polyester material which is transparent and available under the trade name Mylar, of the Du Pont Company of Wilmington, Del., or a polyimide insulation material available from the Du Pont Company of Wilmington, Del., under the trade name Kapton.

Turning now to the integral lightning protection embodiments for metal fasteners shown in FIGS. 3 through 6, it will be noted that the same numerals as used hereinbefore in the description of FIG. 1 and 2 embodiments for similar components are utilized.

The lightning protection protection concept of the embodiment shown in FIG. 3 interrupts the potential electrical path between graphite epoxy composite skin structure 10 and electrically conductive substructure 162 through utilization of electrically non-conductive angle member 106.

Electrically non-conductive bushing 42, comprising e.g. a glass fiber insert, has been retained in this embodiment to keep the fastener from becoming a preferred lightning current path to the lower plies of wing skin laminate 10. In the embodiment of FIG. 3, it can be seen that the options for surface conductivity enhancement have been expanded to include thin aluminum or bronze wires woven into the outer ply of fabric 101 in lieu of the metal (e.g. nickel) coated or plated graphite fibers.

The counterbore 26 of the embodiments of FIGS. 1 and 2, filled with potting compound, has been eliminated. The counterbore becomes less desirable, from a structural standpoint, as the skin 10 gets thinner. Instead, the lightning current is prevented from flowing into the substructure 162 (spar/rib web) by the use of non-conductive angle member 106. Angle member 106 can be made from fiberglass or Kevlar epoxy or non-conductive fibers in a polymeric (plastic) matrix. Non-conductive bushing 42 serves to prevent the fastener from becoming a preferred lightning current path to the lower plies of the skin laminate which, in turn, would cause the fastener to overheat and produce local damage to the graphite epoxy skin.

Metal and graphite epoxy outer ply member 101 enables surface conductivity enhancement, viz. the spread of lightning currents over a large area such that the current density at the lightning attachment point is reduced considerably. Structural integrity of the jointed structure is not compromised since the lightning damage is confined to the outer ply. Repair and refinishing consists of an aerodynamic smoothing patch and topcoat, respectively. Metal and graphite epoxy outer ply 101 was tested utilizing nickel-plated graphite fabric as the outer ply; however, the metal and graphite epoxy outer ply may also comprise any one of metal (e.g. nickel) coated or plated graphite fibers, Fiberite aluminum fibers woven in graphite fabric, or Brochier bronze fibers woven in graphite fabric. The primary purpose of the integral metal and graphite epoxy outer ply is to provide surface conductivity enhancement for lightning current dispersion in contrast to flame spray or Thorstrand which is for lightning current diversion.

Electrically non-conductive bushing 42, comprising a glass fiber insert, is bonded into a hole drilled in graphite epoxy skin laminate 10. The bonding agent used was epoxy resin, lightning testing validation for resistance to electrical breakdown to the longitudinal fibers of the laminate being required. The primary purpose of electrically non-conductive bushing 42 is to prevent the lightning currents from seeking out the longitudinal plies of skin laminate 10 through the fastener hole parallel to the radial or axial direction.

Electrically non-conductive structural angle member 106 provides a very high electrical resistance path between skin 10 and conductive substructure 162, and angle member 106, during tests, comprised fiberglass and Kevlar.

In the embodiment of FIG. 4, electrically conductive structural angle member 62 has been electrically isolated by electrically non-conductive layers 103 and 104 forming an electrically non-conductive barrier between angle member 62 and the skin 10 and, also, between angle member 62 and the fastener/retainer, respectively. Electrically non-conductive bushing 42 is also utilized for the same reasons as hereinbefore discussed in connection with the description of the FIG. 3 embodiment.

The FIG. 4 embodiment; in can be observed, shows a variation of the concept of the embodiment of FIG. 3. Presently, the commonly utilized materials for non-conductive angle member 106 would comprise either fiberglass or Kevlar epoxy. Depending on structural loads and environment, these materials may not be as desirable as graphite epoxy or titanium. Thus, in this embodiment, the metal or conductive angle member 62 has been retained but is then electrically isolated from the skin 10 by a non-conductive layer 103 between skin 10 and angle member 62, and a non-conductive washer 104 between angle member 62 and the fastener retainer (metal nut/collar and washer 63, 65). The non-conductive bushing 42 has been retained in this embodiment for the same reason as in the FIG. 3 embodiment.

Electrically non-conductive barrier 103 provides the aforementioned electrical isolation of two component parts through the faying surface, thereby precluding flow of any electrical currents between the respective components.

Electrically non-conductive washer 104 has the purpose of electrically isolating the fastener retainers (washer and nut) at the structure retainer interface, thereby precluding conduction of any electrical currents between the components.

The embodiment of FIG. 5 is illustrative of localized dielectric protection of fastener heads in graphite epoxy skin 10 and electrical isolation of electrically conductive angle member 62 from electrically conductive metal substructure 162 (e.g. rib/spar web). Secondary applied dielectric layer 105 in the form of strips or patches extending over the fastener heads provides resistance to electrical breakdown from the lightning channel to the fastener or fastener head. By preventing direct lightning attachment to the fastener or fastener hole, this layer 105 provides protection similar to that provided by non-conductive bushing 42, hereinbefore discussed. That is, the lightning attachment is forced to occur at the perimeter of the dielectric or further away from the fastener and will disperse into the laminate through metal and graphite outer ply 101.

It can be recognized that the FIG. 5 embodiment shows yet another variation of the concept shown in the FIG. 3 embodiment. It may be advantageous, from a structural standpoint, depending on skin and spar/rib web thickness, or from manufacturing or assembly considerations, to have the electrical isolation at the angle-to-spar/rib web interface rather than at the angle-to-skin interface. FIG. 5 shows the fastener through the angle and spar/rib web isolated with a non-conductive bushing. The metal or conductive angle 62 is isolated from the spar/rib web 162 by a non-conductive layer 103 between the two. The fastener retainer (typically a metal nut or collar and a metal washer) is isolated from the spar/rib web 162 by a non-conductive washer 104. The fastener through the skin is only countersunk flush with the metal and graphite epoxy outer ply 101; no potting compound is used over the fastener head as in the embodiments of FIGS. 1 and 2. Localized dielectric protection, in the form of a plastic film 105, is used to prevent direct lightning strike attachment to the fasteners in the skin.

The embodiment of FIG. 6 includes, in combination, certain features hereinbefore described in connection with the embodiment of FIGS. 3 and 5, viz. localized dielectric protection of fastener heads (and, as also shown by strip member 52 in FIG. 2, in graphite epoxy composite skin member 10, and isolation of skin member 10 and spar/rib web 162 by electrically non-conductive structural angle member 106. The embodiment of FIG. 6 is seen to include a combination of features from the embodiments of FIGS. 3 and 5. The dielectric 105 on skin 10, in the area of the fasteners, prevents direct attachment of lightning to the fasteners. The non-conductive angle member 106 prevents current from a nearby lightning strike from flowing into the substructure 162. This current could produce arcing between the angle member 106 and the skin 10 and the angle member 106 and the spar/rib web 162. This conceptual embodiment from a standpoint may be preferred where non-conductive bushings are objectionable for either structural or assembly means.

What is claimed is:

1. In combination:
   an integral lightning protection system for an aircraft graphite epoxy structure having a fastener inserted therein;
   an electrically conductive substructural member for supporting said aircraft graphite epoxy structure; and,
   electrically non-conductive means coupled between said fastener and said electrically conductive substructural member.

2. The invention according to claim 1 wherein said electrically non-conductive means comprises an electrically non-conductive structural member.

3. The invention according to claim 1 wherein said electrically non-conductive means comprises a conductive structural member and an electrically non-conductive barrier disposed intermediate said conductive structural member and said electrically conductive substructural member.

4. The invention according to claim 1 wherein said aircraft graphite epoxy structure includes a metal and graphite epoxy outer ply.

5. The invention according to claim 4 wherein said metal and graphite epoxy outer ply has a dielectric outer surface coating.

6. The invention according to claim 5 wherein said dielectric outer surface coating has a primer and paint coating.

* * * * *